April 15, 1930. E. W. SCHELLENTRAGER 1,755,078
WEIGHING INDICATOR
Filed March 20, 1926 2 Sheets-Sheet 2
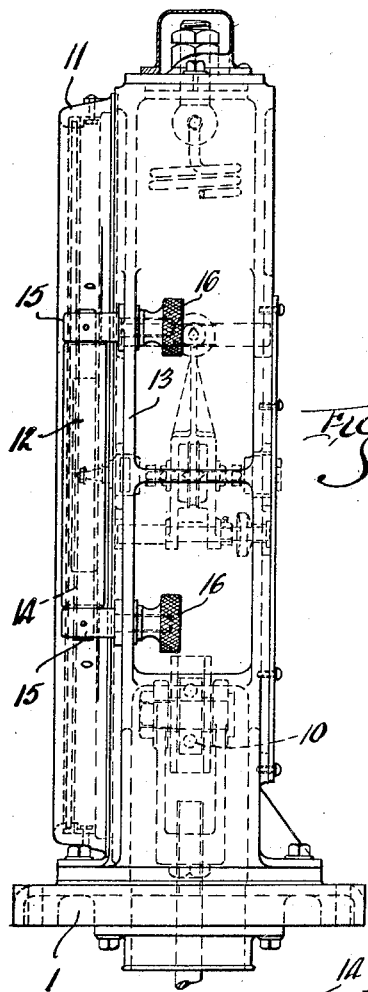
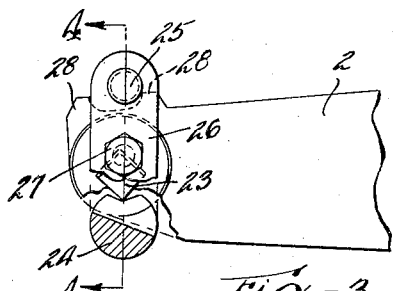
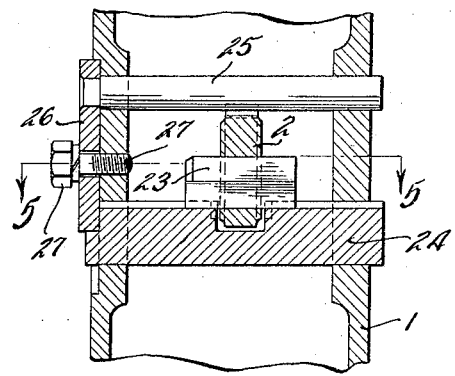
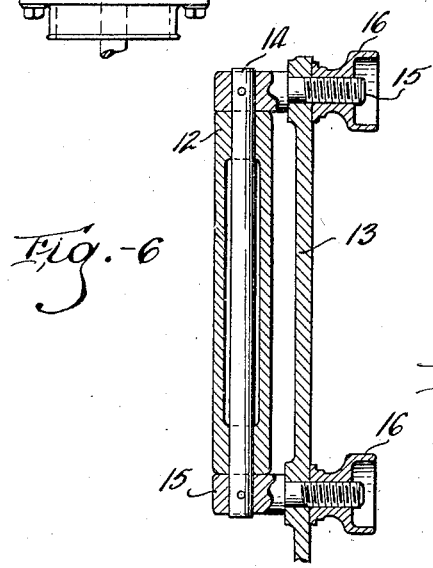
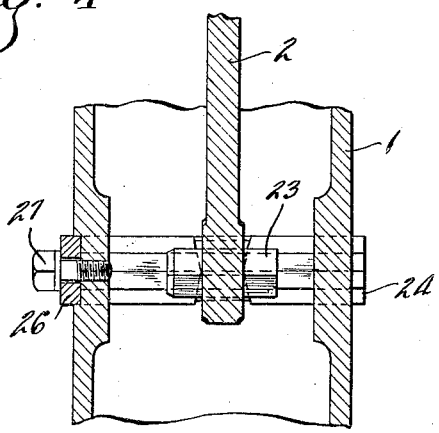
Inventor
Eugene W. Schellentrager
By Brockett + Hyde
Attorneys Patented Apr. 15, 1930

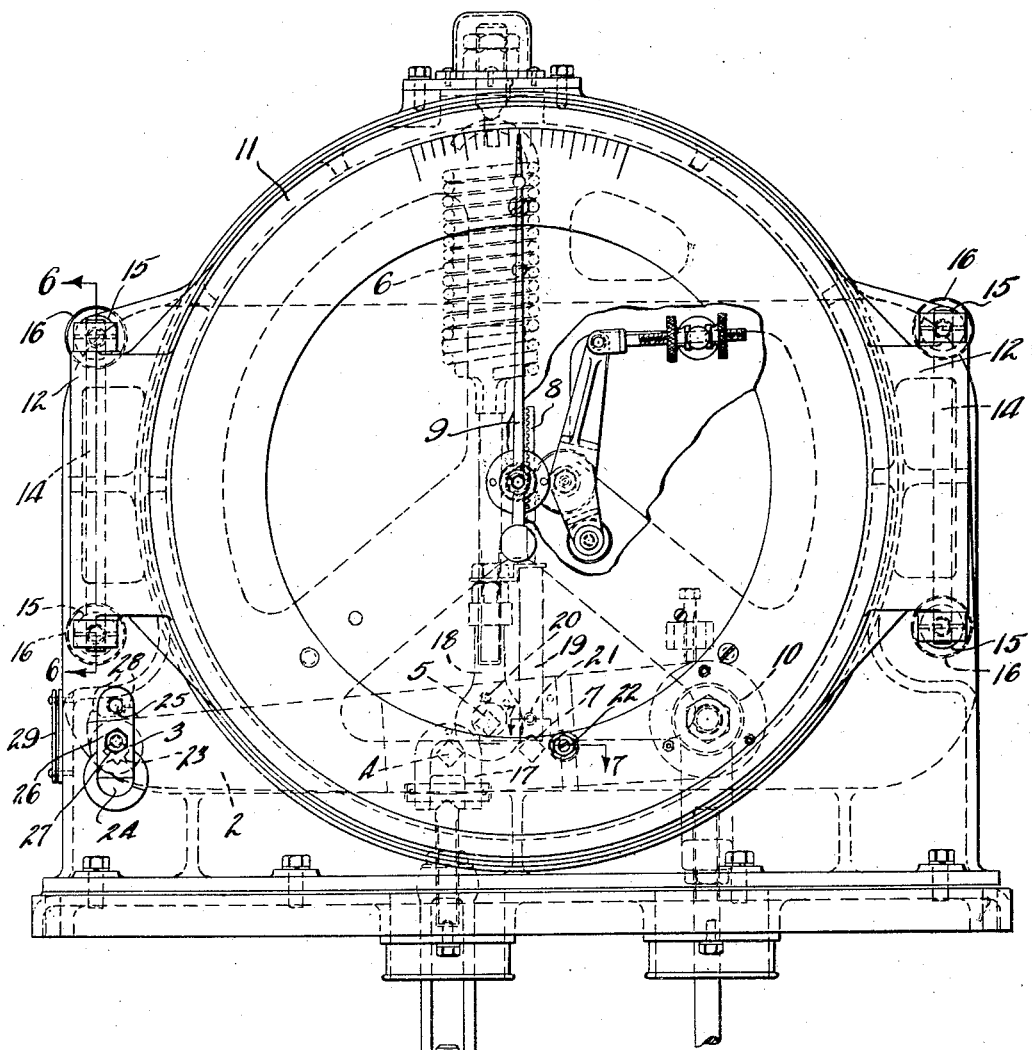
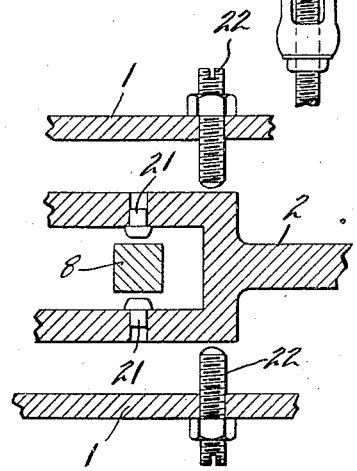

1,755,078

UNITED STATES PATENT OFFICE

EUGENE W. SCHELLENTRAGER, OF CLEVELAND HEIGHTS, OHIO, ASSIGNOR TO THE ATLAS BOLT & SCREW COMPANY, OF CLEVELAND, OHIO, A CORPORATION OF OHIO

WEIGHING INDICATOR

Application filed March 20, 1926. Serial No. 96,213.

This invention relates to weighing indicators and particularly to those such as may be used upon railroad cars, charging trucks or other containers or conveyors wherein various amounts of bulk goods in particular proportions by weight are to be brought together, or wherein various portions by weight of the loads in said containers are to be emptied in various places. The indicator shown herein is intended for use in connection with a recording device which, however, has nothing to do with the present invention.

The objects of this invention are generally improvements over the indicator broadly disclosed in my Patent No. 1,329,567, of February 3, 1920, and consists in improved means of mounting the dial cover, means for securing, aligning and adjusting the balance lever and parts in operative connection therewith, and adjusting means for the balancing spring therein.

The exact nature of these improvements will be apparent from the following description taken in connection with the accompanying drawings in which Figs. 1 and 2 represent front and side elevations respectively of the indicator; Figs. 3, 4 and 5 are details in side elevation, transverse section and horizontal section respectively, of the pivoting means for the balance lever; Fig. 6 is a vertical section showing the manner of mounting the dial cover; and Fig. 7 is an enlarged detail of bearing pins and parts adjacent thereto, employed in my invention.

The principal parts of the weighing indicator are an immovably secured frame and casing 1, wherein is mounted a bearing lever 2, one end of which is pivotally supported upon a knife edge bearing 3 and in connection at 4 with the load container above referred to, so that motion of the load container caused by an alteration in the amount of load therein will be imparted to the lever. At 5 the lever is yieldably supported by a balance spring 6, and at 7 the lever carries a rack 8 cooperating with a pinion coaxially mounted with the indicator needle 9, whereby the relative position of the lever 2 will be indicated by that of the needle. At the end of the lever a ball bearing 10 is mounted, connecting it with a dashpot not shown and having no further relation with the present invention.

The needle 9 is arranged to swing over a suitably graduated dial, which is enclosed by a cover consisting of a circular glass suitably mounted in a metal bezel 11. Integral with the bezel are oppositely spaced laterally extending brackets 12, and extending from the casing 1 are corresponding brackets 13. The brackets 12 are vertically drilled to receive the hinge pins 14 upon each of which is secured at each end an eye bolt 15. Through the brackets 13 extend holes corresponding in elevation with the eye bolt shanks, and through which the shanks may pass and be secured by means of thumb nuts 16, the brackets 13 being so positioned that turning down of the thumb nuts will clamp the bezel against the casing 1; and upon removal of either pair of thumb nuts the dial cover may be swung about the hinge pin at its opposite side. Obviously by removing all of the thumb nuts the cover is free to be lifted from the casing.

The connections between the lever 2 and the load container, the balance spring, and the indicator, generally indicated by the numerals 4, 5 and 7 respectively, are knife edge pivot bearings in detail as follows. That portion of the lever 2 intermediate of its length and adjacent the bearings 4, 5, and 7 is split forming two parallel sides in which and extending between them are secured "knife edge" pivots of square cross section. Cooperating with each of these pivots is a suitable bearing member as, in this case a yoke 17, eye bolt 18, or connecting rod 19. Opposite the bearing member and somewhat adjacent the knife edges the sides of the lever 2 are drilled to receive bearing pins 20 and 21 inserted from the inside of the lever and provided with heads of sufficient dimension to properly position the bearing members upon the pivot members, the pins being maintained in the lever by the presence of the bearing members between them. The eye bolt 18 is split at its bearing portion to receive the yoke 17 which it thus maintains in proper alignment.

In the casing 1 adjacent the split portion of the lever 2 are threaded aligned bearing pins 22 provided with lock nuts, whereby adjustment may be made from without the casing 1 to properly align the lever 2.

The pivot bearing for the lever 2 is constructed as follows. In the end of the lever is fitted a knife edge pivot member 23 extending at each side of the lever and resting upon a bearing member 24 extending across the casing 1 and supported in the sides of the casing. The bearing member is generally round in cross section but is provided with a bearing depression extending its length across it, and a slot at its center to clear that portion of the lever 2 below the pivot 23. The width of the slot at its center is but slightly greater than that of the adjacent portion of the lever 2, but the sides diverge outward as shown in Fig. 5 to allow for any misalignment of the lever 2, and decrease the friction thereon. Somewhat above the bearing 24 and parallel with it extends lock pin 25, supported in the sides of the casing and permanently secured at one end to a lock plate 26 which extends downward therefrom to engage a cut away portion of bearing 24 to prevent movement of the bearing in its seat. The lock plate, and thus the pin 25 and bearing 24, is secured in the casing by the bolt 27 and is placed upon the front or dial side of the casing for easy accessibility. Upon the lever 2 above the pivot 23 are two projections 28, the depression between them being such as to slightly clear the lock pin 25 and serving to prevent unseating of the pivot 23 from its bearing 24. Upon the side of the casing opposite the end of the lever 2 is a removably covered aperture 29, whereby easy inspection of the bearing 3 may be had.

The upper end of the spring 6 passes through an eye bolt extending through a plate on the top of the casing 1 and adjustably supported thereon by a nut and lock nut as shown. A cap 13 secured to the plate 12 protects the spring supporting means from accidental damage or unauthorized adjustment and prevents entry of foreign matter into the indicator.

What I claim is:

1. In an article of the class described, a pivot bearing located between opposed walls, and inwardly extending projections upon said walls and spaced from said bearing for positioning a member pivoting upon said bearing.

2. In an article of the class described, a pivot bearing located between opposed walls, and pins set in said walls and with heads inwardly extending therefrom for positioning a member pivoting upon said bearing.

3. In an article of the class described, a knife edge pivot bearing located between parallel walls, and aligned pins set in said walls and with heads inwardly extending therefrom for maintaining alignment of a member pivoting upon said bearing.

4. In an article of the class described, a pivot bearing located between opposed walls, and pins extending screw threaded through said walls, whereby alignment of a member pivoting upon said bearing may be effected and maintained from without said walls.

5. In an indicator, a pivot bearing comprising a bearing member, a lever member, and a knife edge pivot member in assembled relation with said lever member and having extending portions resting upon said bearing member, said bearing member being slotted to clear said lever, the sides of the slot being spaced to fit that portion of the lever member therebetween, and diverging thence.

6. In an indicator, a pivot bearing comprising a bearing member, a lever member, a knife edge pivot member in assembled relation with said lever member and having extending portions resting upon said bearing member, and a lock pin adjacent said pivot and spaced from said lever to be engageable therewith to prevent unseating thereof.

7. In an indicator, a pivot bearing comprising a bearing member, a lever member, a knife edge pivot member in assembled relation with said lever member and having extending portions resting upon said bearing member, and a lock pin adjacent said pivot, said lever having portions spaced adjacent said lockpin and adapted for engagement therewith to prevent excessive non-pivotal movement of said lever in its pivoting plane.

8. In an indicator, a frame, a bearing member mounted therein, a lever member, and a knife edge pivot member in assembled relation with said lever member and having extending portions resting upon said bearing member, a lockpin in said frame adjacent said pivot, to be engageable by said lever to prevent unseating thereof, and a lockplate on said frame securing said bearing member and lockpin.

9. An indicator, comprising a frame having two opposite walls, a bearing member extending across the space between said walls and through an exposed one thereof and provided with a bearing seat, a shelf lever having a knife edge pivot portion resting in said seat so that the lever swings in a vertical plane, said lever being recessed to provide opposing abutments, and a locking plate attached to the exposed wall and provided with a holding pin passing through said walls and through the recess in said lever and having a portion engaging the end of the bearing member to lock it in place.

10. An indicator of the kind described in claim 9, in which the exposed end of the bearing member is provided with a recess and said locking plate engages the recess to prevent rotation of the bearing member.

11. A construction of the kind described in claim 9, in which said bearing member is provided with a recess beneath the bearing seat therein and into which the shelf lever extends.

In testimony whereof I hereby affix my signature.

EUGENE W. SCHELLENTRAGER.